US011028944B2

(12) United States Patent
Scannell et al.

(10) Patent No.: US 11,028,944 B2
(45) Date of Patent: Jun. 8, 2021

(54) DUCT SUPPORT (71) Applicant: Bell Helicopter Textron Inc., Fort Worth, TX (US)

(72) Inventors: Brent Scannell, L'ile-Bizard (CA); Thomas Mast, Carrollton, TX (US); Jon Damon Bennett, W. Melbourne, FL (US); Joshua Allan Edler, Dallas, TX (US); Jean Pierre Paradis, Sainte Therese (CA); Keith C. Pedersen, North Richland Hills, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 391 days.

(21) Appl. No.: 15/994,518

(22) Filed: May 31, 2018

(65) Prior Publication Data
US 2019/0368636 A1 Dec. 5, 2019

(51) Int. Cl.
*B64D 33/04* (2006.01)
*F16L 3/18* (2006.01)
(Continued)

(52) U.S. Cl.
CPC ........ *F16L 3/18* (2013.01); *B64C 5/00* (2013.01); *F16L 3/202* (2013.01); *F16L 3/26* (2013.01); *B64D 33/04* (2013.01)

(58) Field of Classification Search
CPC .... F16L 3/26; F16L 3/18; F16L 3/202; B64D 33/04
See application file for complete search history.

(56) References Cited

U.S. PATENT DOCUMENTS

| 2003/0021689 A1* | 1/2003 | Hain | F01D 25/246 |
| | | | 416/204 R |
| 2011/0131948 A1* | 6/2011 | Hollimon | F02K 1/004 |
| | | | 60/232 |

(Continued)

FOREIGN PATENT DOCUMENTS

| EP | 3401222 A1 | 11/2018 |
| EP | 3575219 B1 | 6/2020 |

OTHER PUBLICATIONS

EPO Examination Report issued in EP Application 18184587.6 dated Aug. 9, 2019, 3 pages.
(Continued)

*Primary Examiner* — Philip J Bonzell
*Assistant Examiner* — Tye William Abell
(74) *Attorney, Agent, or Firm* — Patent Capital Group (57) ABSTRACT

One example of a duct support for a rotorcraft includes a stabilizing mechanism configured to transfer a weight of a duct to an airframe of the rotorcraft, where the duct undergoes thermal expansion. The stabilizing mechanism includes a first stabilizing member attached to the duct, a second stabilizing member attached to the rotorcraft, and a coupling mechanism where the coupling mechanism is configured to couple the first stabilizing member to the second stabilizing member and accommodate thermal expansion of the duct by allowing for movement of the first stabilizing member relative to the second stabilizing member. In an example, the duct is an exhaust duct of an engine of the rotorcraft and heat from the engine cause the exhaust duct to undergo the thermal expansion.

14 Claims, 11 Drawing Sheets

(51) Int. Cl.
  *B64C 5/00*   (2006.01)
  *F16L 3/202*  (2006.01)
  *F16L 3/26*   (2006.01)

(56) References Cited

U.S. PATENT DOCUMENTS

2016/0130008 A1* 5/2016 Zameroski ............... B64F 5/10
                                                    244/54
2018/0327108 A1* 11/2018 Rosado ................. B64D 41/00

OTHER PUBLICATIONS

EPO Examination Report issued in EP Application 18184587.6 dated Feb. 19, 2019, 6 pages.
Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).
Perry, Dominic, "Analysis: Bell 525 Relentless Cutaway and Technical Description", Flight Global, Flight International, Bell Helicopter, Published Nov. 12, 2014 (8 pages).
EPO Search Report issued in EP Application 18184587.6 dated Feb. 5, 2019, 4 pages.

* cited by examiner

DUCT SUPPORT

TECHNICAL FIELD

This disclosure relates generally to aircraft mounts, and more particularly, though not exclusively, to a duct support.

BACKGROUND

Aircraft are subjected to various forces during operation. An airframe of an aircraft is a structural frame to which other components of the aircraft are attached. During operation some aircraft components generate heat (e.g., an engine) or transfer heat (e.g., an exhaust) and the heat can cause a thermal expansion of the component. The term "thermal expansion" includes the tendency of matter to change in shape, area, and volume in response to a change in temperature. If a component that undergoes thermal expansion is supported, the supporting member needs to be able to accommodate the thermal expansion to help prevent the supporting member from generating unwanted stress.

SUMMARY

According to one aspect of the present disclosure, a support for a component of a rotorcraft can include a stabilizing mechanism configured to transfer a weight of the component to an airframe of the rotorcraft. The stabilizing mechanism can include a first stabilizing member attached to the component of the rotorcraft, a second stabilizing member attached to the rotorcraft, and a coupling mechanism where the coupling mechanism is configured to couple the first stabilizing member to the second stabilizing member and accommodate thermal expansion of the component by allowing for movement of the first stabilizing member relative to the second stabilizing member. The coupling mechanism can include a barrel with a hollow inside portion and a rod that extends through the inside portion of the barrel.

In an example, the first stabilizing member is coupled to the rod and can slide back and forth on the rod to accommodate thermal expansion and allow for movement of the first stabilizing member relative to the second stabilizing member. In another example, the first stabilizing member is secured to the rod and the rod can slide back and forth through the barrel to accommodate thermal expansion and allow for movement of the first stabilizing member relative to the second stabilizing member. In some examples, the first stabilizing member is an integral part of the component. In addition, the component can be a duct or more specifically, and exhaust duct. The component can be an exhaust duct of an engine of the rotorcraft and heat from the engine cause the exhaust duct to undergo the thermal expansion.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed. In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Example embodiments that may be used to implement the features and functionality of this disclosure will now be described with more particular reference to the attached FIGURES.

Figure 1A:
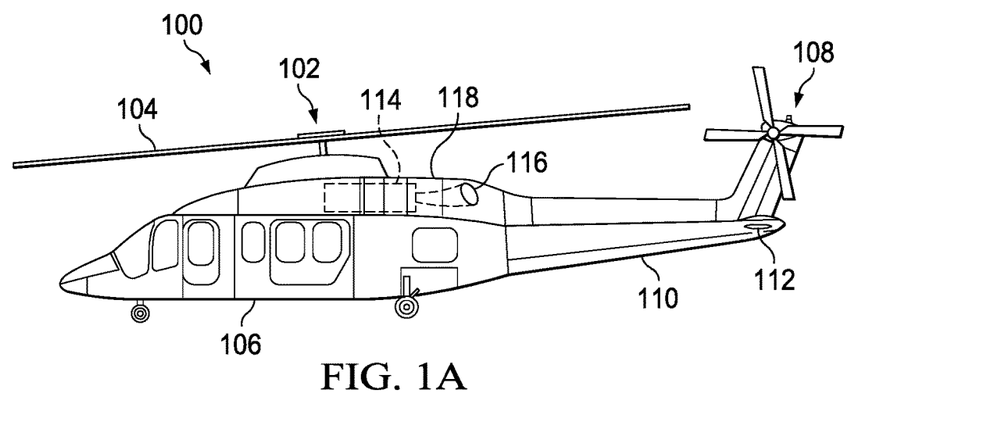
FIGS. 1A and 1B illustrate an example aircraft in accordance with certain embodiments.
Figure 1B:
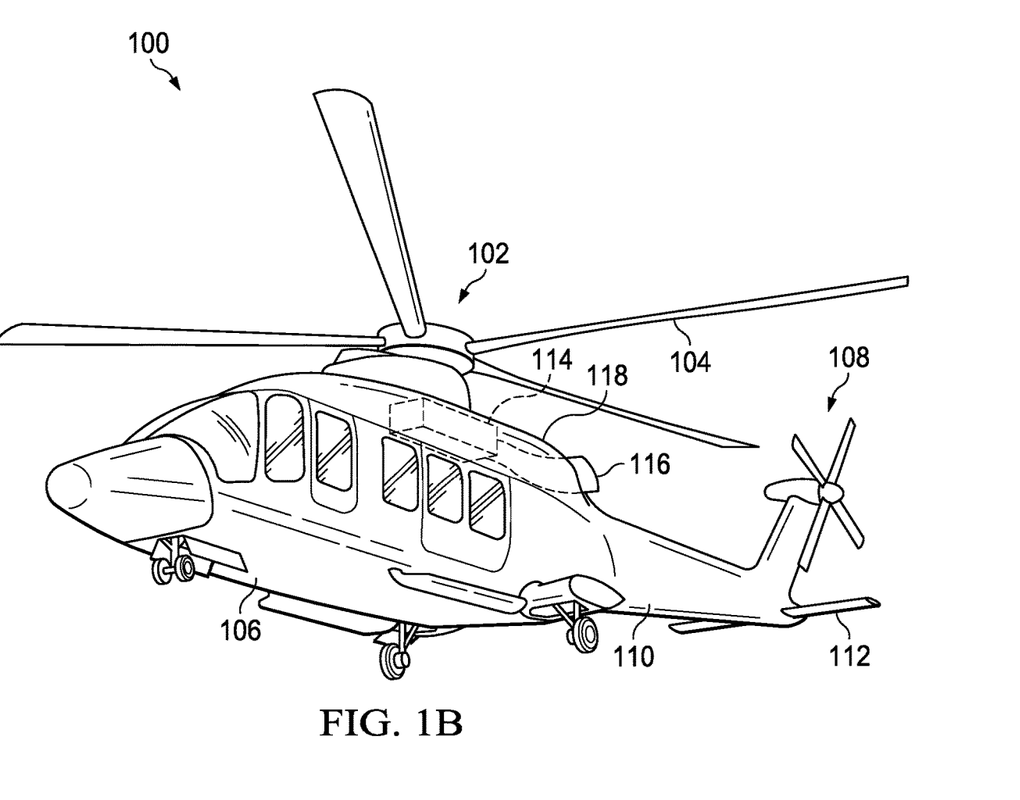

FIGS. 1A and 1B illustrate an example embodiment of a rotorcraft 100. FIG. 1A illustrates a side view of rotorcraft 100, while FIG. 1B illustrates a perspective view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, tail rotor or anti-torque system 108, an empennage 110, and a tail structure 112. In the illustrated embodiment, tail structure 112 may be used as a horizontal stabilizer. Torque is supplied to rotor system 102 and anti-torque system 108 using at least one engine 114. Engine 114 can be included or proximate to rotor system 102. Engine 114 is coupled to a duct 116 (e.g., an exhaust duct) and at least a portion of duct 116 is coupled to an airframe 118 or a secure structure on airframe 118 to help stabilize duct 116 statically as well as during thermal expansion of engine 114 and thermal expansion of duct 116. Airframe 118 includes the outer covering of rotorcraft 100.

It should be appreciated that rotorcraft 100 of FIGS. 1A and 1B is merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

Rotors (e.g., rotor system 102 on rotorcraft 100) can be source of vibrations affecting an airframe of an aircraft. The rotor system rotates blades at a rotational frequency (or "Q"). During operation, when all of the blades of the rotor system are rotating, the blades collectively cause structures supporting the blades (e.g., a mast supporting the blades, an airframe to which the mast is attached) to vibrate as well as surrounding components such as the engine and the exhaust. The rotor system is a source of direct vibrations, which are transmitted to the airframe and components such as the engine and the exhaust. The vibrations of the rotor system cause the other components to vibrate even while such other components also produce vibrations at other frequencies.

Also, the engines of rotorcraft 100 of FIGS. 1A and 1B can produce a relatively large amount of heat and the generated heat can expand the size of the engine. In addition, once incoming air is combusted and expanded inside the engine, it essentially becomes heated exhaust gas (a mixture of air, combustion by-products, un-combusted fuel, etc.) and the heated air and/or combustion gases traveling through the exhaust of rotorcraft 100 can expand the size of the exhaust duct for the engine. Further, the velocity of the air flow through the exhaust duct can cause vibrations, wiggling, movement, etc. of the exhaust. The expansion in size of the engine and/or exhaust duct in addition to the vibrations, wiggling, movement, etc. of the exhaust duct can cause stress on the exhaust duct and without some type of support, the structural integrity of the exhaust duct and connection between the exhaust duct and the engine can fail. Thus, a key challenge is to stabilize the exhaust duct when the size of the engine and/or exhaust duct expand as they are heated. In addition, stabilization of the exhaust duct is needed when the engine and/or exhaust duct vibrate, wiggle, move, etc.

A possible solution to help stabilize the exhaust is to use a stabilizing mechanism that can provide duct (e.g., exhaust) support. The stabilizing mechanism can be coupled to a duct, such as an exhaust duct, and help stabilize the duct when the size of an engine coupled to the duct and/or the duct expand as they are heated. In addition, the stabilizing mechanism can help stabilize the duct as an engine coupled to the duct and/or the duct vibrates, wiggles, moves, etc. The stabilizing mechanism can be coupled to an airframe (e.g., airframe 118).

It is to be understood that other embodiments may be utilized and structural changes may be made without departing from the scope of the present disclosure. Substantial flexibility is provided by rotorcraft 100 in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

Figure 2:
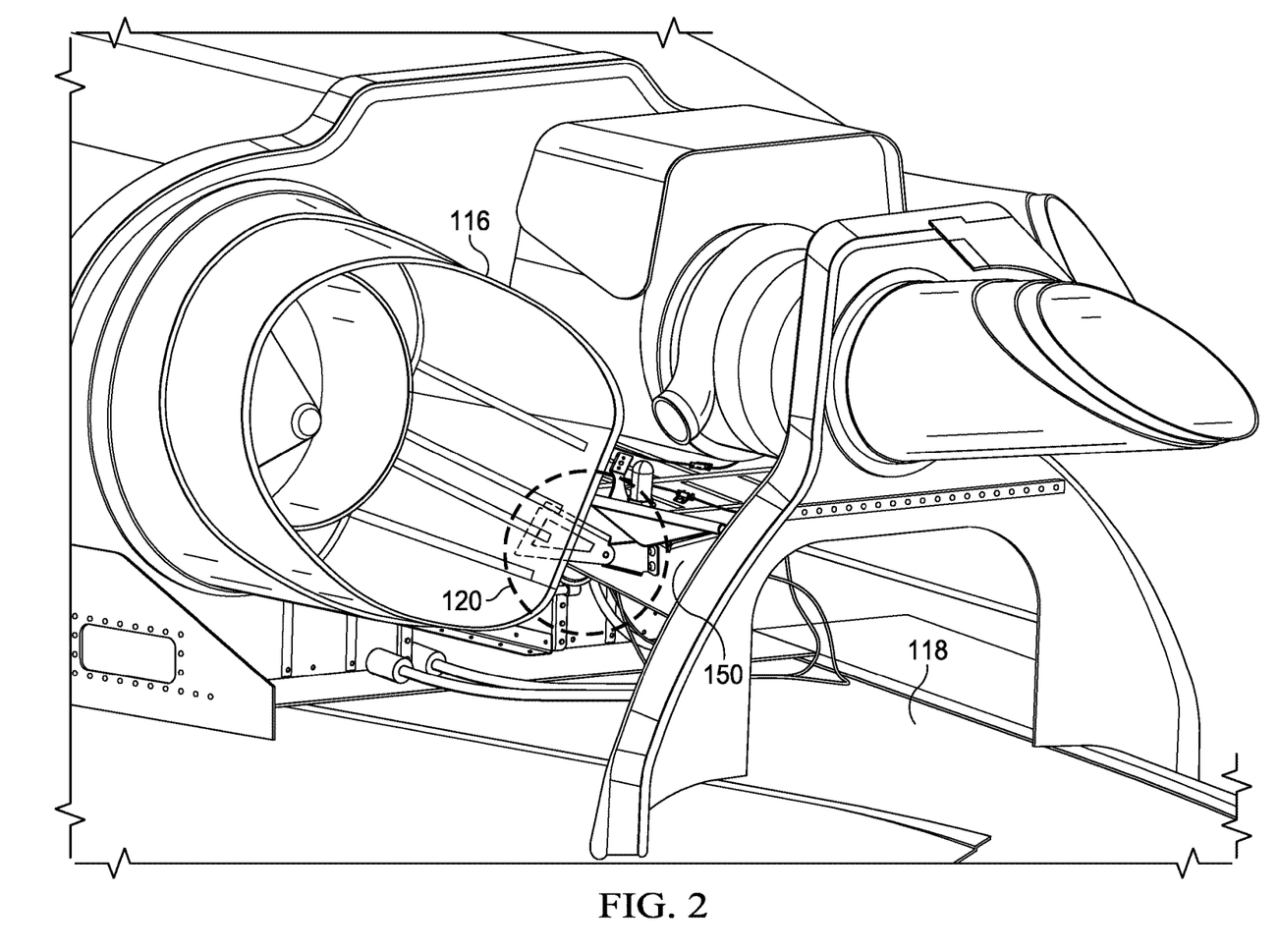
FIG. 2 illustrates an example duct support in accordance with certain embodiments.

Turning to FIG. 2, FIG. 2 illustrates a duct 116 being supported by stabilizing mechanism 120. Duct 116 can be an exhaust duct. Stabilizing mechanism 120 can be coupled to duct 116 and secure structure 150. Secure structure 150 is a secure and relatively stable structure coupled to airframe 118. Secure structure 150 can be an engine mount, secure mount, or some other structure securely coupled to airframe 118. For example, as illustrated in FIG. 2, stabilizing mechanism 120 is coupled to an engine mount on airframe 118. As illustrated in FIG. 2, duct 116 is an exhaust duct where one end opens to the environment. The size and length of duct 116, at least in part, depends on the volume of air that needs to be moved through duct 116 and the desired exit location of the air from duct 116. As the size and length of duct 116 increase, expansion in size of duct 116 due to heat and the stress on duct 116 due to the vibrations, wiggling, movement, etc. can also increase. Stabilizing mechanism 120 can help provide support for duct 116 during thermal expansion and stresses due to vibrations, wiggling, movement, etc.

Figure 3:
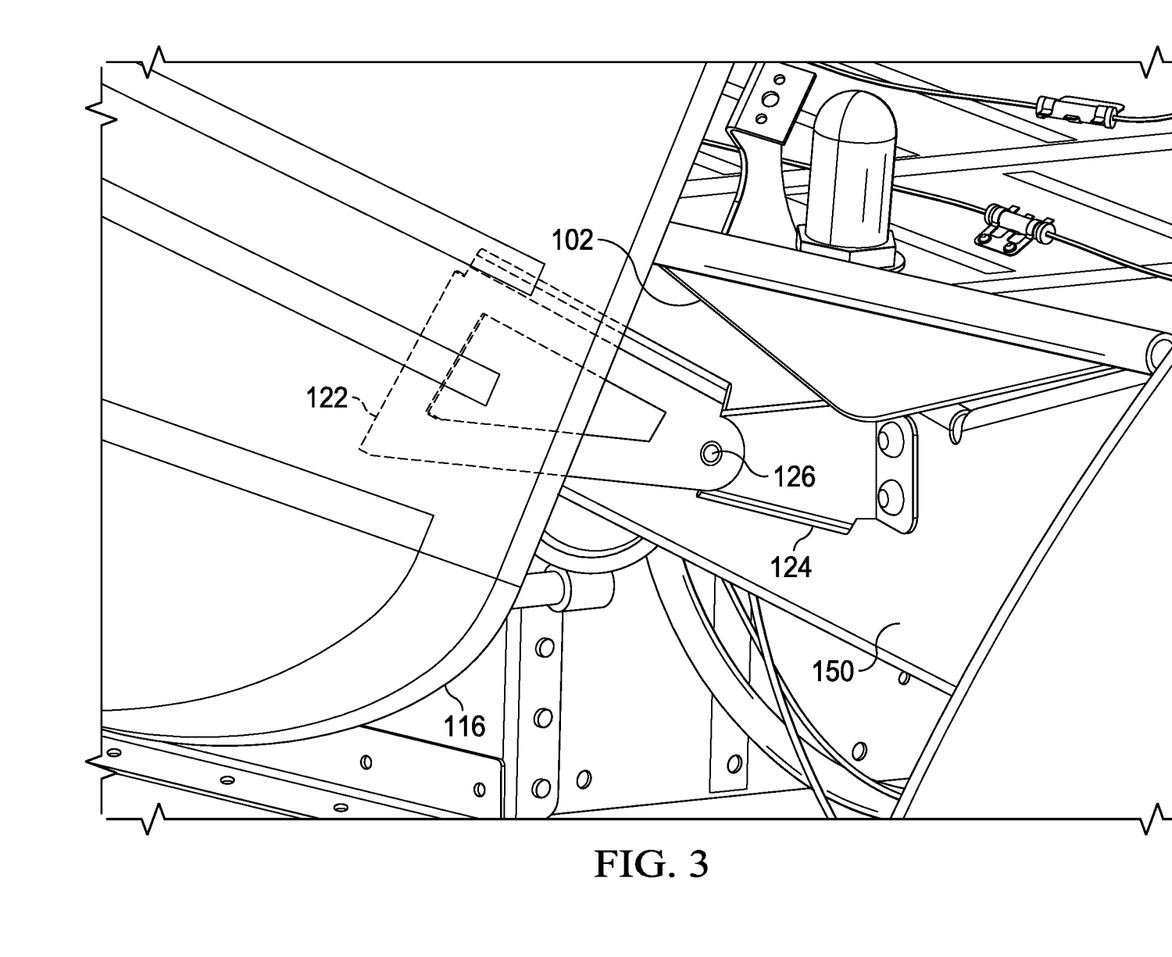
FIG. 3 illustrates an example duct support in accordance with certain embodiments.

Turning to FIG. 3, FIG. 3 illustrates duct 116 being supported by stabilizing mechanism 120. Stabilizing mechanism 120 can include a first stabilizing member 122 and a second stabilizing member 124. First stabilizing member 122 can be coupled to second stabilizing member 124 using a coupling mechanism 126. First stabilizing member 122 can be securely coupled to duct 116. Second stabilizing member 124 can be securely coupled to secure structure 150. In another example, second stabilizing member 124 can be securely coupled to airframe 118 (not shown). Coupling mechanism 126 can allow first stabilizing member 122 to move relative to second stabilizing member 124. For example, as the size and length of duct 116 increases or expands due to thermal expansion and/or duct 116 vibrates, wiggles, moves, etc. first stabilizing member 122 will also move. Coupling mechanism 126 can be configured to absorb some of the movement and still provide support for duct 116 during thermal expansion and stresses due to vibrations, wiggling, movement, etc. In an example, first stabilizing member 122 can be an integral part of duct 116.

Figure 4:
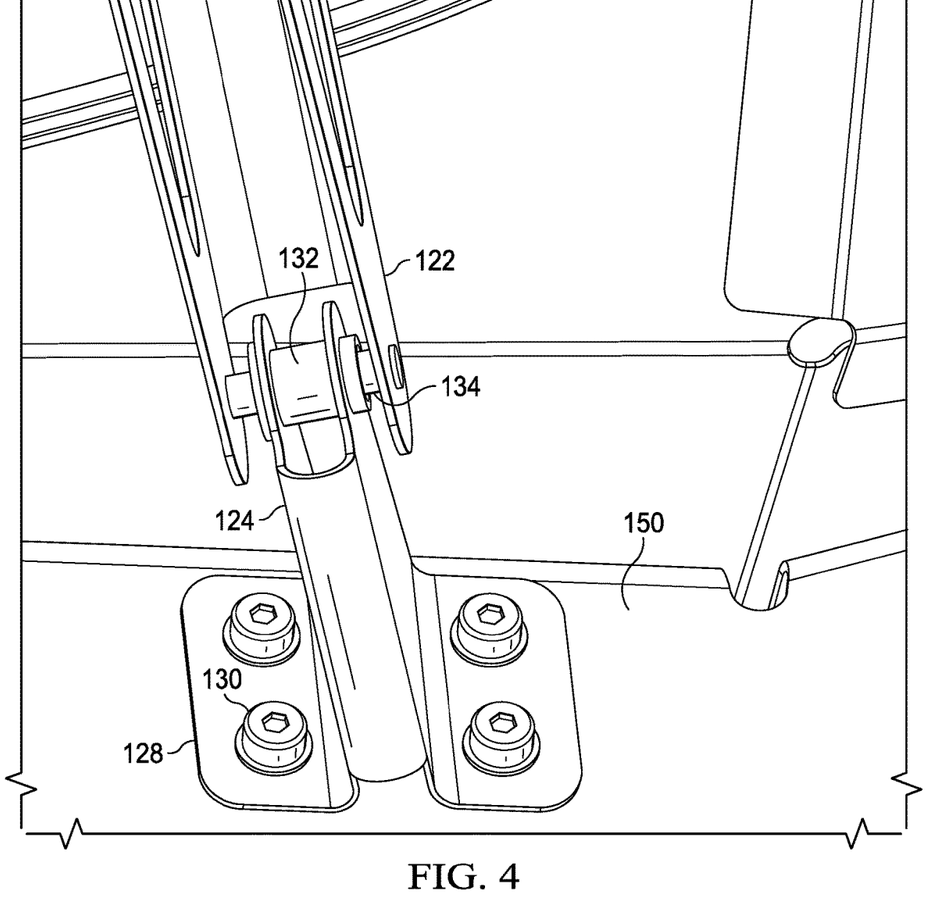
FIG. 4 illustrates a portion of an example duct support in accordance with certain embodiments.

Turning to FIG. 4, FIG. 4 illustrates a portion of stabilizing mechanism 120. Second stabilizing member 124 can be secured to secure structure 150 using an attachment plate 128. Attachment plate 128 can be secured to secure structure 150 using one or more fasteners 130. Fasteners 130 may be rivets, bolts, screws, or some other fastener that can securely couple attachment plate 128 to secure structure 150. In an example, attachment plate 128 may be secured to secure structure 150 using other means than fasteners 130 (e.g., a weld). In addition, attachment plate 128 can be securely coupled to airframe 118 (not shown). Further, other means than attachment plate 128 may be used to secure second stabilizing member 124 to airframe 118.

Coupling mechanism 126 can include a barrel 132 and a rod 134. Barrel 132 can include two open ends and a hollow inside portion. Rod 134 can be inserted through the hollow inside portion of barrel 132. Rod 134 extends past the ends of barrel 132 and first stabilizing member 122 can be coupled to rod 134. The alignment of barrel 132 and rod 134 are such that they are parallel with the direction of thermal expansion of duct 166 (not shown). The alignment of barrel 132 and rod 134 is configured such that no stress or a relatively small amount of stress is imparted to the duct or its support as a result of thermal expansion during normal operation. In an example, coupling mechanism 126 can be configured to have a single degree of freedom of axial translation along a barrel 132 axis and rod 134 axis.

Figure 5A:
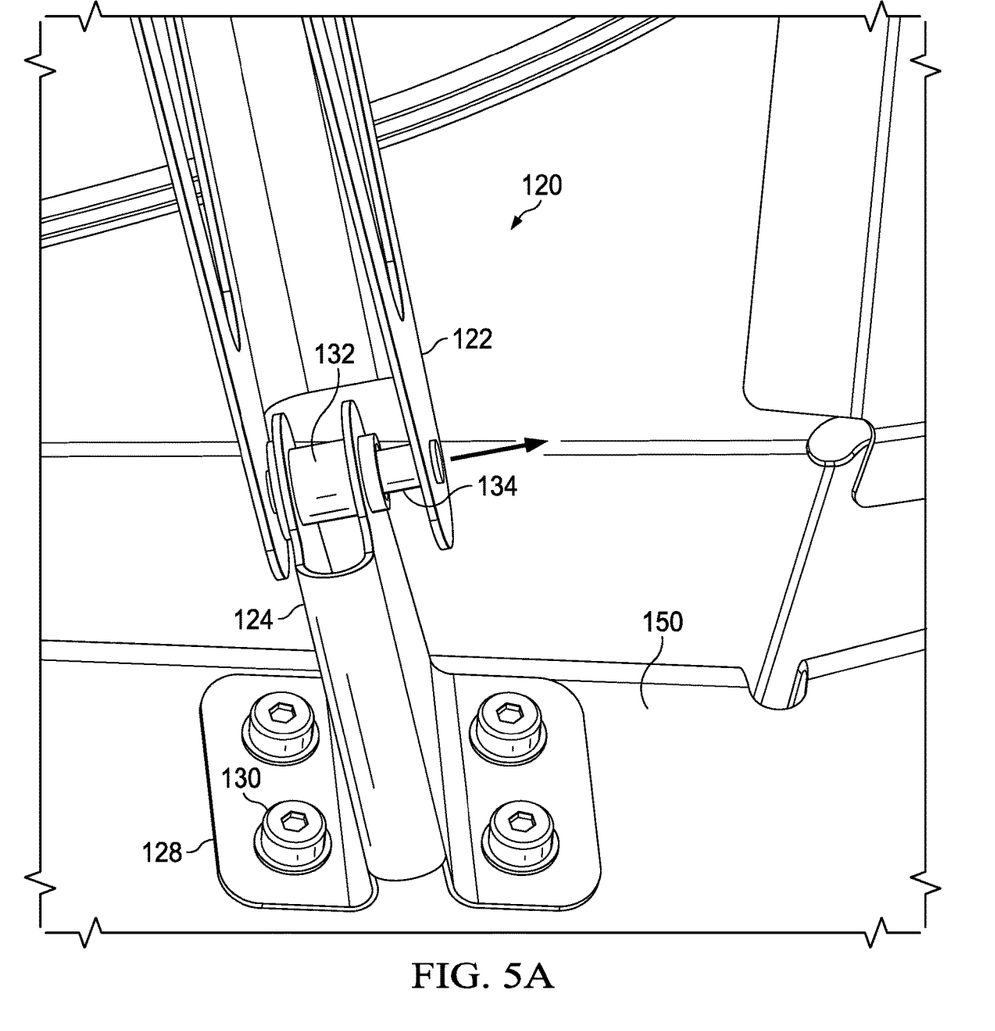
FIGS. 5A and 5B illustrate a portion of an example duct support in accordance with certain embodiments.

Turning to FIG. 5A, FIG. 5A illustrates a portion of stabilizing mechanism 120. In an example, first stabilizing member 122 can be coupled to the ends or proximate to the ends of rod 134. In addition, rod 134 can slide back and forth through barrel 132. As illustrated in FIG. 5A, rod 134 has been slid to the right to accommodate some of the movement and thermal expansion of duct 116 (not shown) and provide support for duct 116 during thermal expansion and stresses due to vibrations, wiggling, movement, etc.

Figure 5B:
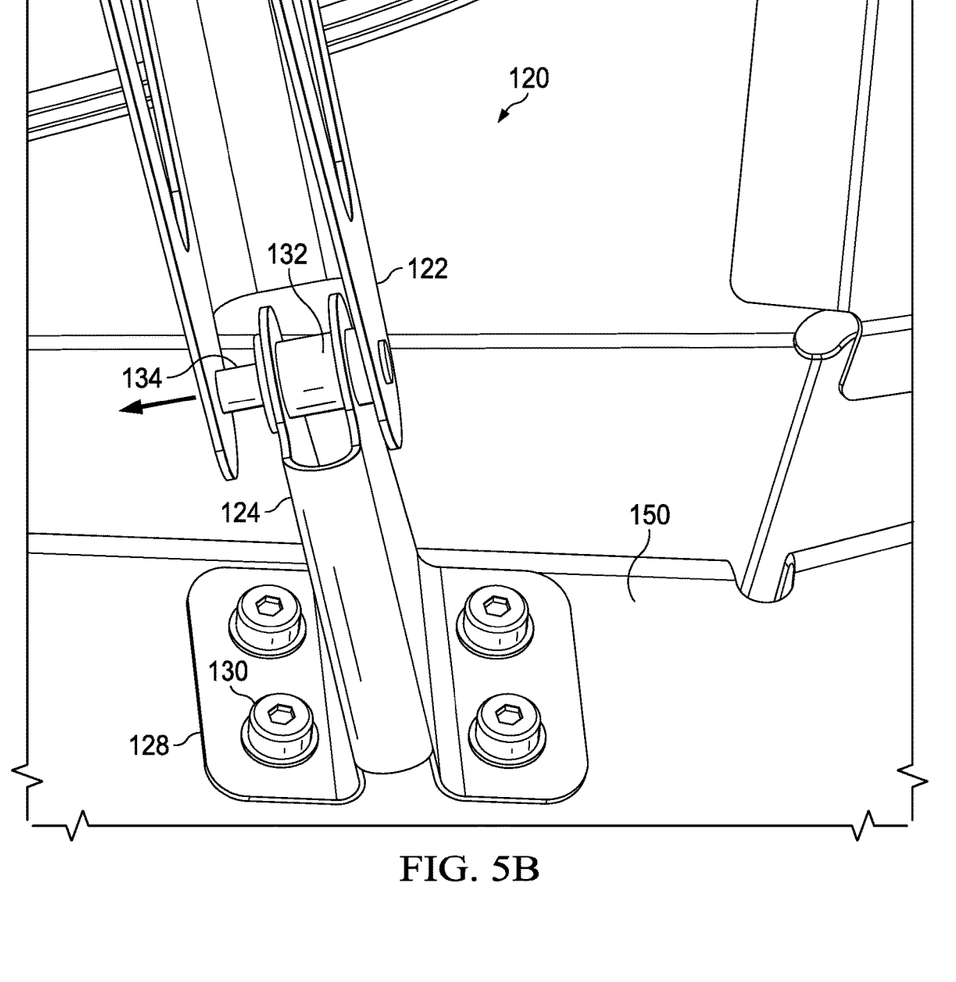

Turning to FIG. 5B, FIG. 5B illustrates a portion of stabilizing mechanism 120. As illustrated in FIG. 5B, rod 134 has been slid to the left to accommodate some of the movement and thermal expansion of duct 116 (not shown) and to provide support for duct 116 during thermal expansion and stresses due to vibrations, wiggling, movement, etc. The total distance rod 134 can slide through barrel 132 depends on the size of rod 134 and barrel 132. The size of rod 134 and barrel 132 can depend on the size of first stabilizing member 122, duct 116, and the amount of thermal expansion and stresses due to vibrations, wiggling, movement, etc. that need to be accommodated. In a specific nonlimiting example, the total distance rod 134 can slide through barrel 132 is about two (2) inches or less. In a specific example, the total distance rod 134 can slide through barrel 132 is about 0.75 inches. In another specific example, the total distance rod 134 can slide through barrel 132 is about half an inch or about 0.25 inches from center in one direction and about 0.25 inches from center in the other direction.

Figure 6A:
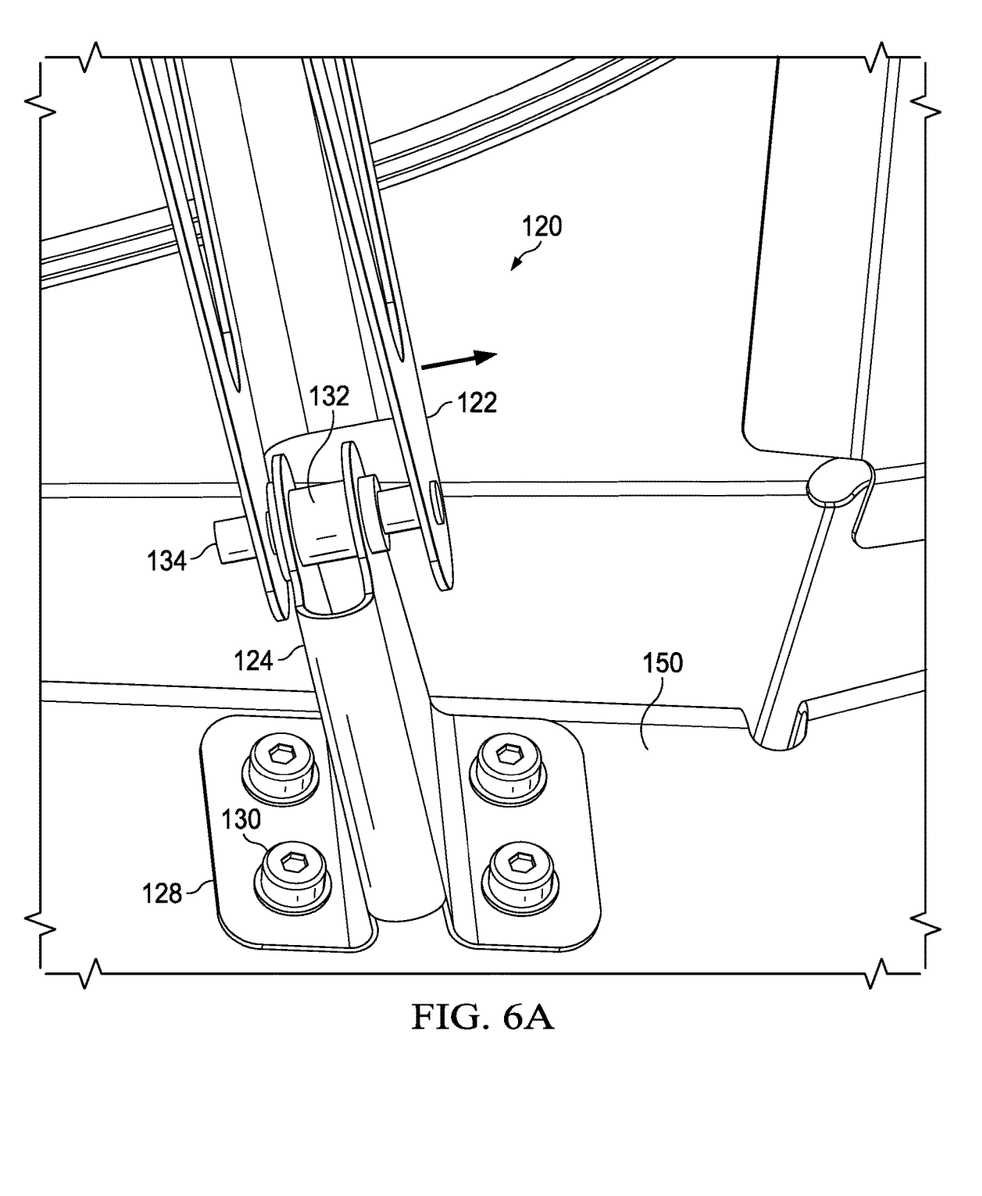
FIGS. 6A and 6B illustrate a portion of an example duct support in accordance with certain embodiments.

Turning to FIG. 6A, FIG. 6A illustrates a portion of stabilizing mechanism 120. In an example, rod 134 is secured to barrel 132 and is not allowed to slide through barrel 132. First stabilizing member 122 can be coupled to rod 134 and allowed to slide back and forth across rod 134.

As illustrated in FIG. 6A, first stabilizing member 122 has been slid across rod 134 to the right to accommodate some of the movement of duct 116 (not shown) and provide support for duct 116 during thermal expansion and stresses due to vibrations, wiggling, movement, etc.

Figure 6B:
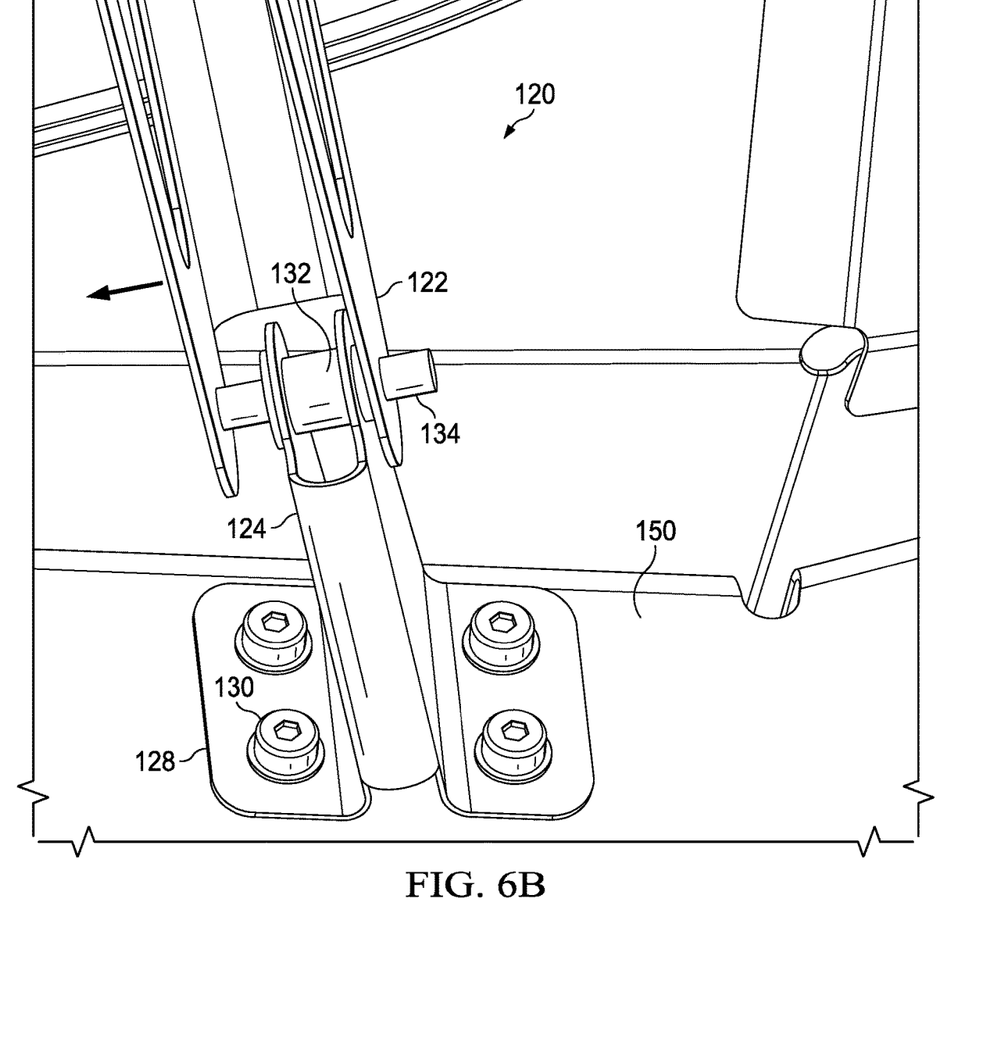

Turning to FIG. 6B, FIG. 6B illustrates a portion of stabilizing mechanism 120. As illustrated in FIG. 6B, first stabilizing member 122 has been slid across rod 134 to the left to accommodate some of the movement of duct 116 (not shown) and provide support for duct 116 during thermal expansion and stresses due to vibrations, wiggling, movement, etc. The total distance first stabilizing member 122 can slide across rod 134 depends on the size of rod 134 and barrel 132. The size of rod 134 and barrel 132 can depend on the size of first stabilizing member 122, duct 116, and the amount of thermal expansion and stresses due to vibrations, wiggling, movement, etc. that needs to be accommodated. In a specific nonlimiting example, the distance first stabilizing member 122 can slide across rod 134 is about 2 inches or less. In a specific example, the distance first stabilizing member 122 can slide across rod 134 is about 0.75 inches. In another specific example, the distance first stabilizing member 122 can slide across rod 134 is about half an inch or about 0.25 inches from center in one direction and about 0.25 inches from center in the other direction.

Figure 7:
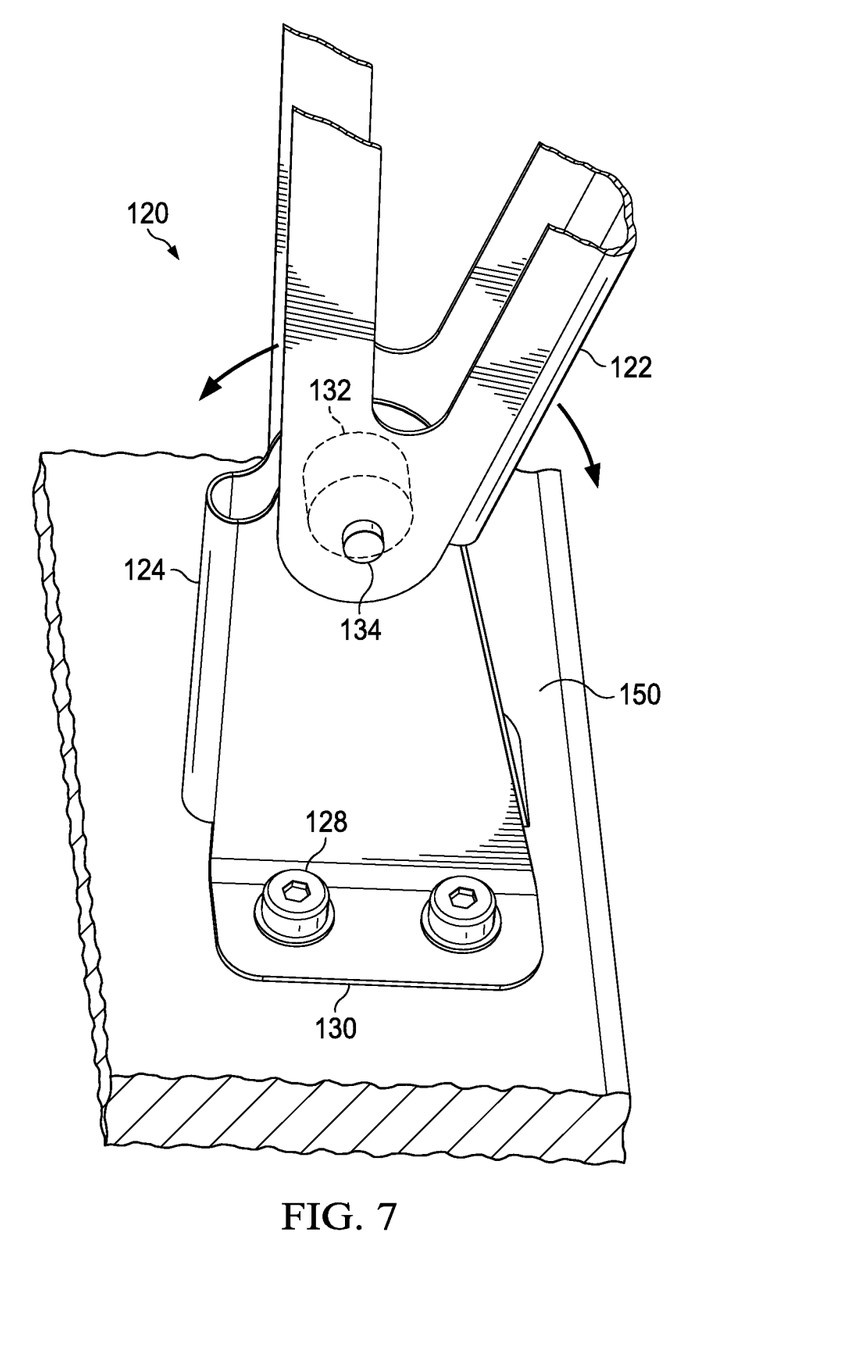
FIG. 7 illustrates a portion of an example duct support in accordance with certain embodiments.

Turning to FIG. 7, FIG. 7 illustrates a portion of stabilizing mechanism 120. In an example, rod 134 can rotate while in barrel 132. The rotation of rod 134 can allow stabilizing mechanism 120 to accommodate some of the movement of duct 116 (not shown) and provide support for duct 116 during thermal expansion and stresses due to vibrations, wiggling, movement, etc. The total distance or degrees that rod 134 and first stabilizing member 122 coupled to rod 134 can rotate depends on the size of rod 134 and barrel 132. The size of rod 134 and barrel 132 can depend on the size of first stabilizing member 122, duct 116, and the amount of thermal expansion and stresses due to vibrations, wiggling, movement, etc. that need to be accommodated. In an example, the total amount first stabilizing member 122 can rotate is about one-hundred and eighty (180) degrees. In a specific example, the total amount first stabilizing member 122 can rotate is less than about fifteen (15) degrees. In another example, first stabilizing member 122 does not rotate at all or only slightly rotates. In an example, first stabilizing member 122 can be considered as a link mechanism that does not have any moment reaction capability and thus does not induce any bending (e.g., rotational) stress or induces a relatively small amount of bending stress into either duct 116 or secure structure 150. First stabilizing member 122 can be configured to react to direct load without any moment reaction or relatively small moment reaction. By allowing rod 134 to slide through barrel 132 as illustrated in FIGS. 5A and 5B, first stabilizing member 122 to slide across rod 134 as illustrated in FIGS. 6A and 6B, and/or rod 134 to rotate while in barrel 132 (which in turn causes first stabilizing member 122 to rotate as first stabilizing member 122 is coupled to rod 134), stabilizing mechanism 120 can accommodate thermal expansion experienced by duct 116 and stresses due to vibrations, wiggling, movement, etc. while still supporting duct 116.

Figure 8:
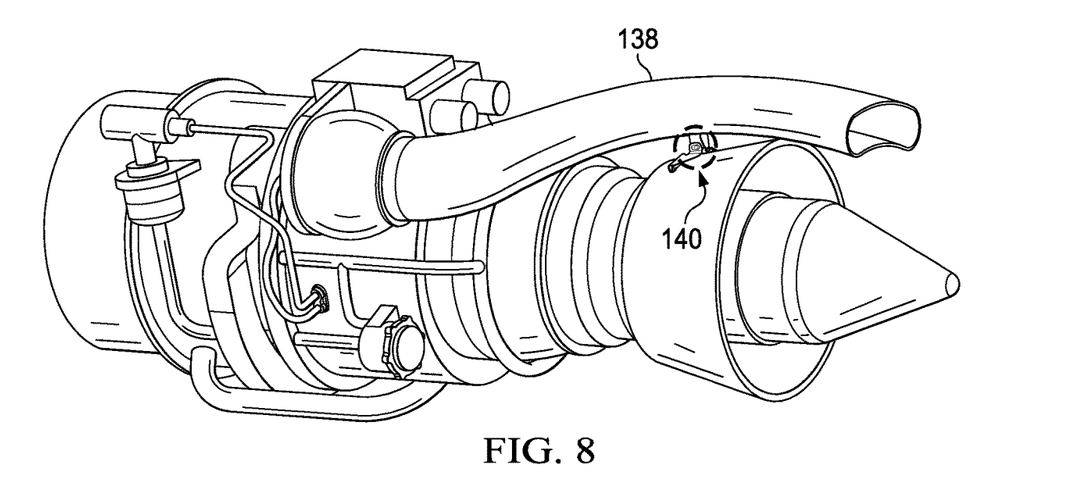
FIG. 8 illustrates an example duct support in accordance with certain embodiments.

Turning to FIG. 8, FIG. 8 illustrates a secondary duct 138 being supported by a lateral stabilizing mechanism 140. Lateral stabilizing mechanism 140 can be a lateral and vertical stabilizing mechanism. In an example, lateral stabilizing mechanism 140 can be coupled to secondary duct 138 and airframe 118 (not shown). In other examples, lateral stabilizing mechanism 140 may be coupled to a secure and relatively stable structure on airframe 118. For example, as illustrated in FIG. 8, lateral stabilizing mechanism 140 is coupled to an engine on airframe 118. As illustrated in FIG. 8, secondary duct 138 is an exhaust duct where one end opens to the environment. Secondary duct 138 may be an engine exhaust or part of a particle separator. The size and length of secondary duct 138, at least in part, depends on the volume of air that needs to be moved through secondary duct 138 and the desired exit location of the air from secondary duct 138. As the size and length of secondary duct 138 increases, expansion in size of the duct due to heat and the stress on the duct due to the vibrations, wiggling, movement, etc. also increases. Lateral stabilizing mechanism 140 can help provide support for secondary duct 138 during thermal expansion and stresses due to vibrations, wiggling, movement, etc. For example, lateral stabilizing mechanism 140 can provide lateral and vertical support as the engine heats up or otherwise expands and/or as secondary duct 138 heats up and expands.

Figure 9:
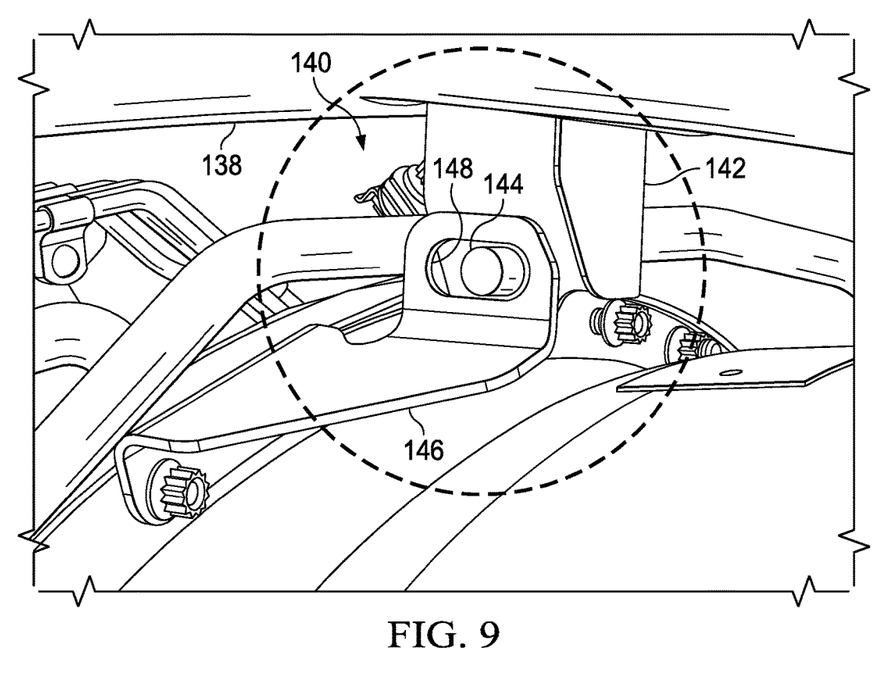
FIG. 9 illustrates portion of an example duct support in accordance with certain embodiments.

Turning to FIG. 9, FIG. 9 illustrates secondary duct 138 being supported by lateral stabilizing mechanism 140. In an embodiment, lateral stabilizing mechanism 140 is an integral part of secondary duct 138. Lateral stabilizing mechanism 140 can include a body 142. Body 142 can include a stabilizing pin 144.

A secure mount 146 can be secured to airframe 118 (not shown) or a relatively stable structure on airframe 118 (e.g., a main engine). Secure mount 146 can include a stabilizing channel 148. In an example, the alignment of stabilizing channel 148 is along the direction of thermal growth or expansion of secondary duct 138. Body 142 can be coupled to secure mount 146 by coupling stabilizing pin 144 to stabilizing channel 148. Stabilizing pin 144 can slide back and forth inside stabilizing channel 148 and allow body 142 to move relative to secure mount 146. For example, as the size and length of secondary duct 138 increases or expands and/or secondary duct 138 vibrates, wiggles, moves, etc., body 142 (which is coupled to secondary duct 138) will also move. Also, if secure mount 146 is secured to a main engine, the main engine will expand. Stabilizing pin 144 coupled to stabilizing channel 148 can accommodate some of the movement and be configured to provide support for secondary duct 138 during thermal expansion and stresses due to vibrations, wiggling, movement, etc.

Figure 10A:
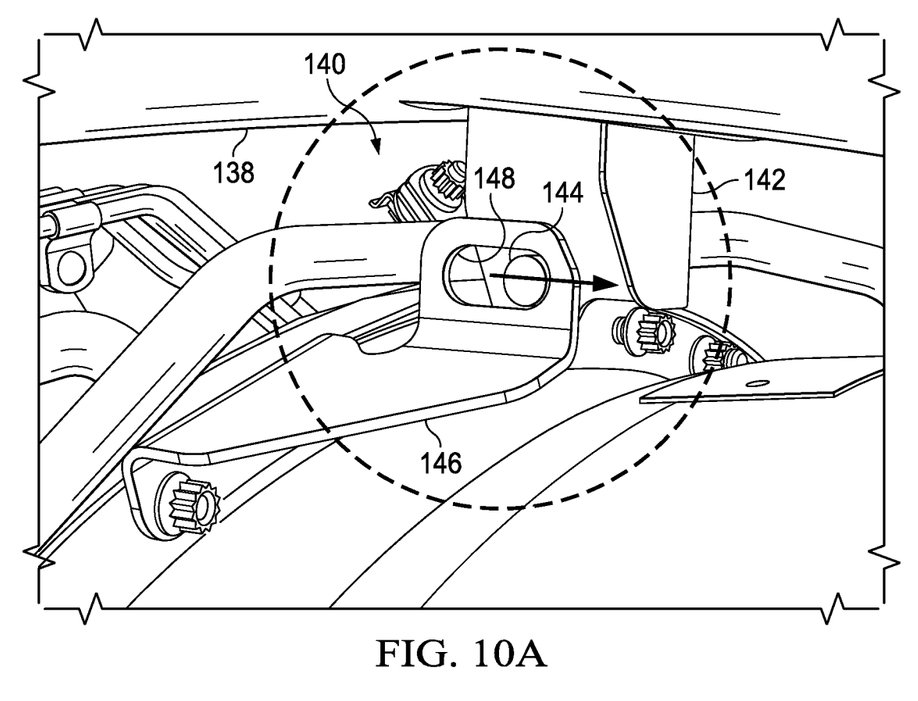
FIGS. 10A and 10B illustrate a portion of an example duct support in accordance with certain embodiments.

Turning to FIG. 10A, FIG. 10A illustrates a portion of lateral stabilizing mechanism 140. As illustrated in FIG. 10A, stabilizing pin 144 has been slid to the right of stabilizing channel 148 to accommodate some of the thermal expansion, contraction, or movement of secondary duct 138 and/or a main engine. Because body 142 is coupled to secondary duct 138 and body 142 includes stabilizing pin 144, this allows body 142 to provide support for secondary duct 138 during thermal expansion and stresses due to vibrations, wiggling, movement, etc. In an example, a primary function of body 142 is to provide support with the intent of limiting the vertical or up and down travel of secondary duct 138 where the geometry of secondary duct 138 provides less stiffness. In some examples, secondary duct 138 can be thin and oriented flat with respect to a ground plane, so duct 128 has high side to side stiffness but low vertical or up and down stiffness.

Figure 10B:
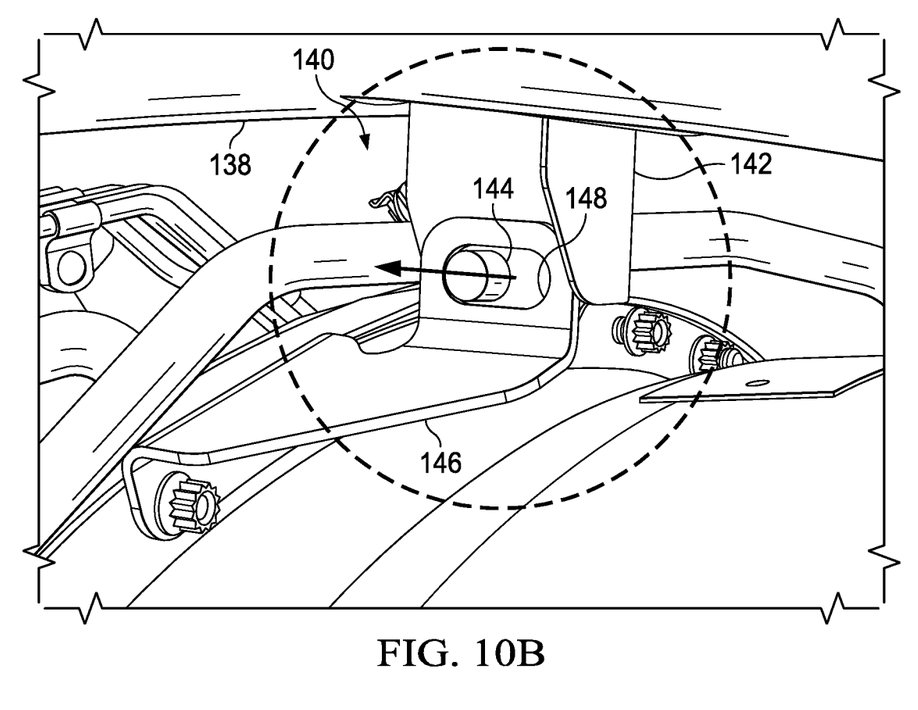

Turning to FIG. 10B, FIG. 10B illustrates a portion of lateral stabilizing mechanism 140. As illustrated in FIG. 10B, stabilizing pin 144 has been slid to the left of stabilizing channel 148 to accommodate some of the thermal expansion, contraction, or movement of secondary duct 138. Because body 142 is coupled to secondary duct 138 and body 142 includes stabilizing pin 144, this allows body 142 to provide support for secondary duct 138 during thermal expansion and stresses due to vibrations, wiggling, movement, etc. The total distance stabilizing pin 144 can slide across stabilizing channel 148 depends on the size of stabilizing pin 144 and stabilizing channel 148. The size of stabilizing pin 144 and stabilizing channel 148 can depend on the size of secondary duct 138, the size of body 142, the amount of support needed to support secondary duct 138, and the amount of thermal expansion and stresses due to vibrations, wiggling, movement, etc. that need to be accommodated. In a specific nonlimiting example, the total distance stabilizing pin 144 can slide across stabilizing channel 148 is less than about 2 inches. In a specific example, the total distance stabilizing pin 144 can slide across stabilizing channel 148 is between about 0.75 inches to about 1.5 inches. In another specific example, the total distance stabilizing pin 144 can slide across stabilizing channel 148 is about 0.42 inches.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:
1. A support for a component of a rotorcraft, the support comprising:
    a stabilizing mechanism configured to transfer a weight of the component to an airframe of the rotorcraft, wherein the component of the rotorcraft undergoes thermal expansion, wherein the stabilizing mechanism includes:

a first stabilizing member attached to the component of the rotorcraft;

a second stabilizing member attached to the rotorcraft, wherein a portion of the second stabilizing member extends above the airframe of the rotorcraft; and a coupling mechanism located in the portion of the second stabilizing member that extends above the airframe of the rotorcraft, the coupling mechanism including a barrel with a hollow inside portion and a rod that extends through the inside portion of the barrel along a first axis, wherein a portion of the first stabilizing member extends past the coupling mechanism, wherein the coupling mechanism is configured to rotatably couple the first stabilizing member to the second stabilizing member and-allow the first stabilizing member to simultaneously slide back and forth and to rotate relative to the second stabilizing member about the first axis.

2. The support of claim 1, wherein the first stabilizing member is coupled to the rod and can slide back and forth on the rod to accommodate thermal expansion and allow for movement of the first stabilizing member relative to the second stabilizing member.

3. The support of claim 1, wherein the first stabilizing member is secured to the rod and the rod can slide back and forth through the barrel to accommodate thermal expansion and allow for movement of the first stabilizing member relative to the second stabilizing member.

4. The support of claim 1, wherein the first stabilizing member is an integral part of the component.

5. The support of claim 1, wherein the component is an exhaust duct of an engine of the rotorcraft and heat from the engine can cause the exhaust duct to undergo the thermal expansion.

6. The support of claim 1, wherein the first stabilizing member and the portion of the second stabilizing member that extends above the airframe of the rotorcraft extend from the airframe along a second axis, wherein the second axis is substantially perpendicular to the first axis.

7. The support of claim 1, wherein the component is a duct.

8. The support of claim 7, wherein the duct is an exhaust duct.

9. A rotorcraft comprising:

an airframe configured to support one or more components of the rotorcraft, the one or more components comprising:

an aircraft system comprising at least one heat generating element;

a duct configured to vent heat from the heat generating element to the environment;

a stabilizing mechanism configured to transfer a weight of the duct to the airframe of the rotorcraft, wherein the duct of the rotorcraft undergoes thermal expansion, wherein the stabilizing mechanism includes:

a first stabilizing member attached to the duct of the rotorcraft;

a second stabilizing member attached to the rotorcraft, wherein a portion of the second stabilizing member extends above the airframe of the rotorcraft; and a coupling mechanism located in the portion of the second stabilizing member that extends above the airframe of the rotorcraft, the coupling mechanism including a barrel with a hollow inside portion and a rod that extends through the inside portion of the barrel along a first axis, wherein a portion of the first stabilizing member extends past the coupling mechanism, wherein the coupling mechanism is configured to rotatably couple the first stabilizing member to the second stabilizing member and allow the first stabilizing member to simultaneously slide back and forth and to rotate relative to the second stabilizing member about the first axis.

10. The rotorcraft of claim 9, wherein the first stabilizing member is coupled to the rod and can slide back and forth on the rod to accommodate thermal expansion and allow for movement of the first stabilizing member relative to the second stabilizing member.

11. The rotorcraft of claim 9, wherein the first stabilizing member is secured to the rod and the rod can slide back and forth through the barrel to accommodate thermal expansion and allowing for movement of the first stabilizing member relative to the second stabilizing member.

12. The rotorcraft of claim 9, wherein the first stabilizing member is an integral part of the duct.

13. The rotorcraft of claim 9, wherein the duct is an exhaust duct.

14. The rotorcraft of claim 9, wherein the heat generating element is an engine, the duct is an exhaust duct of the engine, and heat from the engine can cause the exhaust duct to undergo the thermal expansion.

* * * * *